June 30, 1959 R. D. SCHELDORF 2,892,935

LIMITER CIRCUIT

Filed June 21, 1954

INVENTOR.
RANALD D. SCHELDORF
BY
Charles H. Brown
ATTORNEY

United States Patent Office 2,892,935

Patented June 30, 1959

2,892,935

LIMITER CIRCUIT

Ranald Detlef Scheldorf, Oaklyn, N.J., assignor to Radio Corporation of America, a corporation of Delaware Application June 21, 1954, Serial No. 438,127

4 Claims. (Cl. 250—27)

The invention relates to voltage limiter circuits, and particularly to voltage limiter circuits used to limit synchronizing signals applied to saw-tooth oscillators.

In cathode-ray oscilloscopes, it is frequently necessary or desirable to synchronize the frequency of the sweep voltage generator, usually a saw-tooth oscillator, with the frequency of some external synchronizing signal. In many instances, as the oscilloscope is being used for various indications, the amplitude of the external synchronizing signal may vary over a wide range. Such variations in the amplitude of the synchronizing signal require a manual adjustment, either at the oscilloscope or at the source of the synchronizing signal, so as to maintain the amplitude of the synchronizing signal within the range for which the sweep voltage generator is adjusted.

An object of the invention is to provide an improved voltage limiter and synchronizing circuit that maintains output voltages at a constant amplitude for wide variations in the amplitude and frequency of input voltages.

Another object of the invention is to provide a voltage limiter and synchronizing circuit having an improved and more stable frequency response.

Another object of the invention is to provide a voltage limiter and synchronizing circuit for the external synchronizing circuit of a cathode-ray oscilloscope that eliminates the need for manually adjusting the amplitude of the external synchronizing signal with variations in amplitude.

In accordance with the invention, the output of the limiter and synchronizing circuit is connected through a D.-C. path including a resistor to a saw-tooth oscillator. The D.-C. coupling between the limiter and synchronizing circuit and the saw-tooth oscillator provides an improved and a more stable overall frequency response that is not attainable with capacitive coupling. When such a limiter and synchronizing circuit are used with a saw-tooth oscillator in a cathode-ray oscilloscope, it is unnecessary to adjust manually the amplitude of the external synchronizing signal with variations in amplitude when the oscilloscope is being used.

Figure 1:
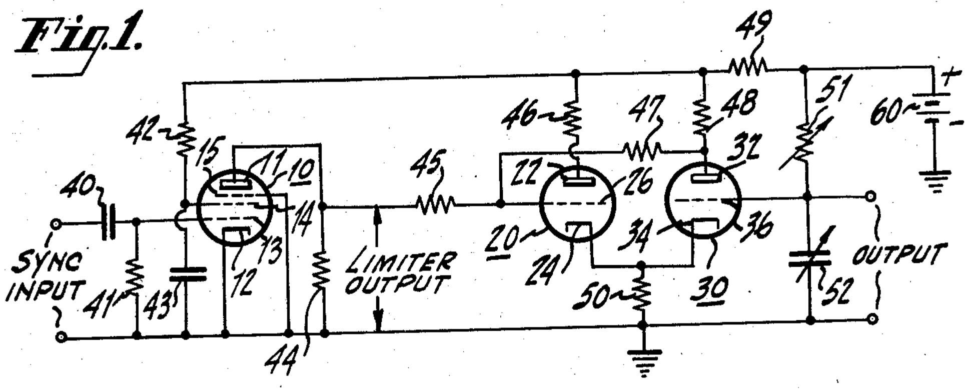
Figure 2:
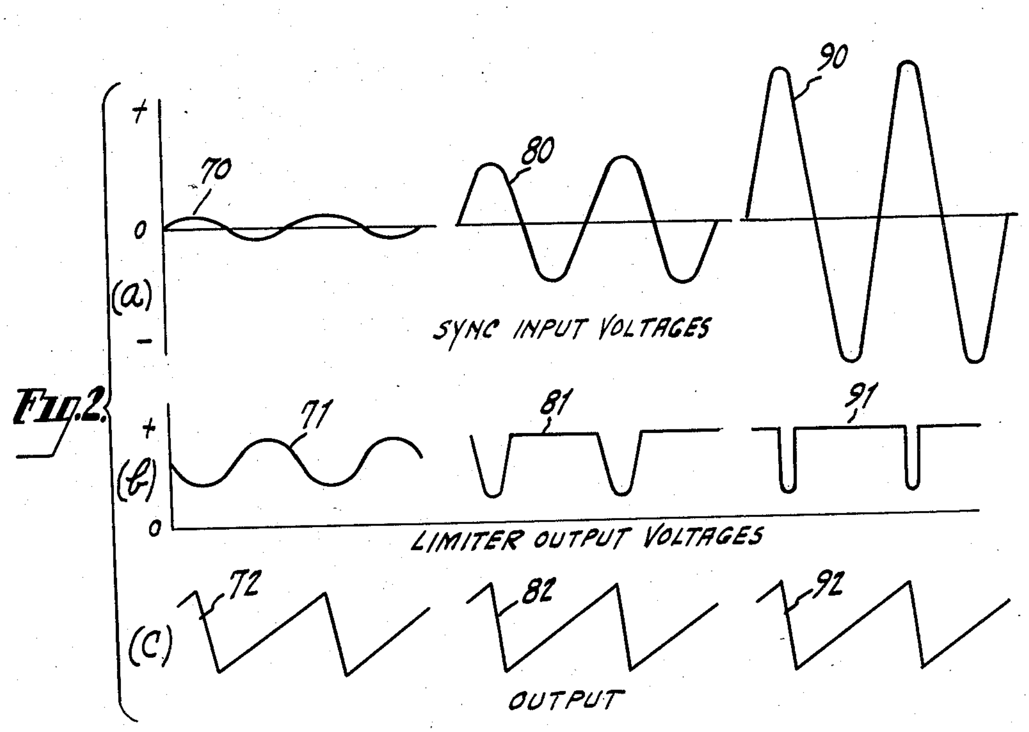

The invention is explained in detail in the following description with reference to the accompanying drawing, in which:

Figure 1 shows a circuit diagram of a combined limiter and synchronizing circuit in accordance with the invention; and Figure 2 shows several examples of waveforms explaining the operation of the limiter and synchronizing circuit of Figure 1.

In Figure 1, the electron discharge tube 10 serves as the limiter. The tube 10 may be a conventional pentode vacuum tube having an anode 11, a cathode 12, a control grid 13, a screen grid 14, and a suppressor grid 15. The cathode 12 and the suppressor grid 15 are connected to a point of reference potential, such as ground. The input circuit for the synchronizing signal includes a capacitor 40 connected to the control grid 13 and a resistor 41 connected between the control grid 13 and the point of reference potential. The limiter and synchronizing circuit output is direct current or D.-C. connected to a saw-tooth oscillator by the resistor 45. This resistor 45 is connected between the anode 11 of the tube 10 and the grid 26 of tube 20 of the saw-tooth oscillator, and serves to improve and stabilize the frequency response of the system, particularly at the low end. The anode 11 is connected to the positive terminal of a source of D.-C. potential 60 over a path which includes the series connected resistors 45, 47, 48 and 49. The screen grid 14 is connected to the positive terminal of the source of D.-C. potential 60 through the resistors 42 and 49, and is by-passed to the point of reference potential by the capacitor 43. The limiter output resistor 44 is connected between the anode 11 and the point of reference potential. This resistor 44 serves a dual purpose as an anode load resistor for the limiter tube 10 and as a part of the D.-C. bleeder network comprising the resistors 44, 45, 47 for applying the proper potential to the anode 11 of the limiter tube 10.

While the limiter and synchronizing circuit can be used with almost any type of saw-tooth oscillator, only one oscillator circuit is shown. This particular oscillator is of the type described by Schlesinger in his Patent No. 2,383,822, issued on August 28, 1945. Such an oscillator comprises the two electron discharge tubes 20 and 30. The tubes 20 and 30 are conventional triode structures that may be enclosed in separate envelopes or in a single envelope. The anodes 22 and 32 are connected through the resistors 46 and 48, respectively, and 49 to the positive terminal of the source of D.-C. potential 60. The cathodes 24 and 34 are connected together and connected to one end of the resistor 50, which is connected to the point of reference potential or ground at its other end. A resistor 47 is connected between the anode 32 and the control grid 26. The output capacitor 52, which may be variable or selectable from a number of different size capacitors, is connected between the control grid 36 and the point of reference potential. The charging resistor 51, which is also variable, is connected between the positive terminal of the source of D.-C. potential 60 and the control grid 36. During the time the tube 20 is rendered conductive by the limiter output voltage, the current flowing through the tube 20 and the resistor 50 produces a bias voltage on the cathode 34 that prevents the tube 30 from conducting. During this same time, the capacitor 52 is being charged by the source of D.-C. potential 60. When the tube 20 is cut off by the limiter output voltage, the bias voltage on the cathode 34 drops and tube 30 conducts, allowing the capacitor 52 to discharge by a current flow between the control grid 36 and the cathode 34. When the tube 20 conducts again, the other tube 30 is cut off and the capacitor 52 is charged again. In this way, the oscillator produces a saw-tooth voltage having a frequency or repetition rate synchronized with the frequency of an external signal.

In the operation of the invention, a synchronizing signal is applied to the input circuit of tube 10. This signal has some particular amplitude and frequency, such as, for example, a signal having any one of the waveforms 70, 80, or 90 in Figure 2(*a*). Since the upper positive value of the limiter output is fixed at some predetermined level, the respective limiter output voltage waves 71, 81 and 91, derived from the anode 11 of the limiter tube 10 and shown in Figure 2(*b*), will never exceed this value. As a result of this constant limiter output, the respective outputs 72, 82, and 92 shown in Figure 2(*c*) of the saw-tooth oscillator are constant, and also have the same frequency or repetition rate as the synchronizing signal. With the proper selection of the component parts for the circuit shown in Figure 1, a constant limiter output is maintained despite a variation in the amplitude of the synchronizing signal by a ratio of forty to one.

Typical values of the component parts which may be used are as follows:

| | | |
|---|---|---|
| Tube **10** | | 6BH6 |
| Tubes **20** and **30** | | 6BQ7A |
| Capacitor **40** | microfarads | 0.033 |
| Capacitor **43** | do | 10.0 |
| Capacitor **52** | | Variable |
| Resistor **41** | megohms | 10 |
| Resistor **42** | ohms | 180,000 |
| Resistor **44** | do | 8,200 |
| Resistor **45** | do | 22,000 |
| Resistor **46** | do | 10,000 |
| Resistor **47** | do | 18,000 |
| Resistor **48** | do | 47,000 |
| Resistor **49** | do | 25,000 |
| Resistor **50** | do | 4,700 |
| Resistor **51** | | Variable |
| Source **60** | volts | 350 |

With components having the above values used in Figure 1, the limiter output voltage remains substantially at seven volts for variations in the amplitude of the synchronizing signal between .25 volt and 25 volts, over a frequency range between ten cycles or less and one megacycle.

What is claimed is:

1. A voltage limiter and synchronizing circuit, comprising a saw-tooth oscillator having first and second electron discharge tubes each having an anode, a cathode, and a control grid, a resistor for biasing said tubes having one end connected to both of said cathodes and the other end connected to a point of reference potential, a capacitor for developing said saw-tooth oscillations connected between the control grid of the first of said electron discharge tubes and said point of reference potential, a resistor connected to said capacitor for supplying a charging current thereto, a resistor connected to each anode of said electron discharge tubes for supplying a positive direct current potential to said anodes, a resistor connected between the anode of said first electron discharge tube and the control grid of said second electron discharge tubes for supplying a positive direct current potential to said control grid of said second electron discharge tube, a limiter electron discharge tube having an anode, a cathode, a control grid, a screen grid, and a suppressor grid, said cathode of said limiter tube being connected to said point of reference potential, a resistor connected between said control grid of said limiter tube and said point of reference potential for applying a synchronizing signal to said limiter tube, a resistor connected to said screen grid of said limiter tube for supplying a positive direct current potential to said screen grid, a capacitor connected between said screen grid of said limiter tube and said point of reference potential, a connection between said suppressor grid of said limiter tube and said point of reference potential, a resistor connected between said anode of said limiter tube and said point of reference potential for deriving a limited output voltage having the same frequency as said synchronizing signal, and a resistor connected between said anode of said limiter tube and said control grid of said second oscillator tube for controlling the frequency of oscillation of said oscillator from said limited output voltage of said limiter.

2. A voltage limiter and synchronizing circuit for a saw-tooth oscillator, comprising a limiter electron discharge tube having an anode, a cathode, and a control grid, said cathode being connected to a point of reference potential, a resistor connected between said control grid and said point of reference potential for applying a synchronizing signal to said limiter tube, an output resistor connected between said anode and said point of reference potential for deriving a limited output voltage having the same frequency as said synchronizing signal, a saw-tooth oscillator having an input circuit, a coupling resistor directly connected between said anode and said input circuit of said saw-tooth oscillator for controlling the frequency of oscillation of said oscillator from said limited output voltage, and a resistor connected to said coupling resistor at said input circuit of said saw-tooth oscillator for applying a direct current potential to said anode.

3. A voltage limiter and synchronizing circuit for a saw-tooth oscillator, comprising a limiter discharge tube having an anode, a cathode, a control grid, a screen grid, and a suppressor grid, said cathode being connected to a point of reference potential, a resistor connected between said control grid and said point of reference potential for applying the synchronizing signal to said limiter tube, a resistor connected to said screen grid for supplying a direct current potential thereto, a capacitor connected between said screen grid and said point of reference potential, a direct connection between said suppressor grid and said point of reference potential, an output resistor connected between said anode and said point of reference potential for deriving a limited output voltage having the same frequency as said synchronizing signal, a saw-tooth oscillator having a terminal for receiving a synchronizing signal, a coupling resistor connected between said anode and said terminal for controlling the frequency of oscillation of said oscillator from said limited output voltage, and a resistor connected to said terminal for applying a direct current potential to said anode through said coupling resistor.

4. A voltage limiter and synchronizing circuit, comprising a saw-tooth oscillator having first and second electron discharge tubes each having an anode, a cathode, and a control grid, a resistor for biasing said tubes having one end connected to both of said cathodes and the other end connected to a point of reference potential, a capacitor for producing saw-tooth oscillations connected between the control grid of the first of said electron discharge tubes and said point of reference potential, a resistor connected to said capacitor for supplying a charging current thereto, a resistor connected to each of said anodes for supplying a positive direct current potential thereto, a limiter electron discharge tube having an anode, a cathode, a control grid, a screen grid and a suppressor grid, said cathode of said limiter tube being connected to said point of reference potential, a resistor connected between said control grid of said limiter tube and said point of reference potential for applying a synchronizing signal to said limiter tube, a resistor connected to said screen grid of said limiter tube for supplying a positive direct current potential to said screen grid, a capacitor connected between said screen grid of said limiter tube and said point of reference potential, a connection between said suppressor grid of said limiter tube and said point of reference potential, and a bleeder network comprising three serially connected resistors for applying a direct current potential to said anode of said limiter tube and for coupling the output of said limiter tube to said saw-tooth oscillator, the first of said bleeder resistors being connected between said anode of said first oscillator tube and said control grid of said second oscillator tube, the second of said bleeder resistors being connected between said control grid of said second oscillator tube and said anode of said limiter tube, and the third of said bleeder resistors being connected between said anode of said limiter tube and said point of reference potential.

References Cited in the file of this patent

UNITED STATES PATENTS

| | | |
|---|---|---|
| 1,830,240 | Peterson | Nov. 3, 1931 |
| 2,220,260 | Meier | Nov. 5, 1940 |
| 2,358,545 | Wendt | Sept. 19, 1944 |
| 2,383,822 | Schlesinger | Aug. 28, 1945 |
| 2,401,214 | Worcester | May 28, 1946 |
| 2,430,154 | Woodward | Nov. 4, 1947 |
| 2,519,057 | Luck | Aug. 15, 1950 |
| 2,561,817 | Parker | July 24, 1951 |
| 2,763,718 | Collins | Sept. 18, 1956 |